3,102,003
SEPARATION OF GASES OF DISSOCIATED AMMONIA

Joseph T. Kummer, Midland, Mich., assignor to The Dow Chemical Company, Midland, Mich., a corporation of Delaware
No Drawing. Filed Aug. 15, 1960, Ser. No. 49,420
3 Claims. (Cl. 23—210)

This invention relates to a process for separating hydrogen and nitrogen gases from dissociated ammonia, and particularly deals with a method for preparing hydrogen gas of uniform purity.

Users of hydrogen gas have heretofore generally found it necessary to either buy highly purified hydrogen gas in tanks, which is costly, or invest large amounts of capital in equipment for preparing and purifying hydrogen gas. The present invention provides a method of inexpensively preparing intermediate quantities of hydrogen and nitrogen gases where higher purity than that found in dissociated ammonia is required.

Ammonia decomposes according to the reaction $$2NH_3 \rightleftharpoons N_2 + 3H_2$$

It can be dissociated at temperatures around 900° F. in the presence of nickle-iron catalysts. Compared to hydrogen gas, ammonia can be more easily and more safely stored and transported: ammonia being stored as a non-explosive liquid, a state not possible with hydrogen.

For some purposes dissociated ammonia is an ideal gas, hydrogen shielding the metal from oxidation and nitrogen reacting with the metal surface. Nitriding of metals in order to cause surface hardening is an example of a process wherein dissociated ammonia may be considered an ideal gas. In other metal working processes, however, nitrogen as well as oxygen may be advantageously excluded because of undesirable affects caused by nitriding. For example, use of a hydrogen atmosphere during the annealing of stainless steel prevents surface oxidation which would require later removal, but if nitrogen is present in the atmosphere thereby allowing nitriding to occur, it will produce surface embrittlement which largely destroys the advantages to be gained from annealing. Nitriding of ferrous alloys containing columbium and titanium creates damaging embrittlement. Some processes involving filament wire and other components of electron tubes must be performed in a nitrogen and oxygen free atmosphere as oxidation of nitriding brittleness destroy the utility of these components. In such processes hydrogen gas may be effectively employed provided it contains only small amounts of nitrogen.

Hydrogen gas for purposes such as metal treatment need not be highly purified, 95% hydrogen being satisfactory. Therefore a simple method of separating the gases of readily available and cheap dissociated ammonia would be most advantageous.

The primary object of this invention is to provide a method for gross separation of hydrogen and nitrogen gases from dissociated ammonia. Another object is to provide a method of preparing hydrogen gas of at least 95% purity.

My invention broadly stated provides for a method of separating hydrogen and nitrogen gases from dissociated ammonia by adsorbing the nitrogen under prescribed conditions on active carbon and observing a certain step sequence. First the hydrogen-nitrogen mixture from a dissociator is compressed to 100 p.s.i.g. (pounds per square inch gauge pressure) or above and charged into a bed of active carbon to pressurize it in a short time interval. After bed is pressurized, it is depressurized from the exit end of the bed as distinguished from the inlet or pressurizing end to not less than 2 p.s.i.g. and the hydrogen gas released during the pressure reduction is collected. The carbon bed is then evacuated to a final pressure of about 10 mm. mercury. The hydrogen is delivered to a reservoir and mixed to ensure uniform composition at time of use.

If lower initial pressures are used, for example about 25 to 99 p.s.i.g., the gas may be depressurized to a somewhat lower pressure. Thus, if the initial pressure is below 100 p.s.i.g. the carbon bed may be depressurized to about atmospheric pressure with removal of hydrogen gas having at least 95% purity. I prefer not to use lower initial pressures as they are generally less satisfactory.

The following is a detailed description of my process, it being understood the details and modifications may be altered to fit individual requirements and preferences.

Anhydrous ammonia is fed at a rate of about 24 pounds per hour from storage tanks to a commercial ammonia dissociator. The feed stream of ammonia is preheated in a heat exchanger and cracked to hydrogen and nitrogen at high temperatures in the presence of a suitable catalyst. The gases flowing from the dissociator at a rate of about 1,000 standard cubic feet per hour, delivered at 5 p.s.i.g., are water cooled to 60° F.

The cooled gas, consisting of about 75% $H_2$ and about 25% $N_2$, is then piped directly to an adsorber unit of the system. This unit esentially consists of a vertical charcoal bed 8 inches in diameter, 6 feet long, and having about 2 cubic feet packed volume and 1.5 cubic feet gas space. It is charged with a gas adsorbent grade of charcoal having a high surface and good abrasion resistance.

The hydrogen and nitrogen mixture after being pressurized to approximately 110 p.s.i.g. is cooled with water in an after-cooler. This high pressure gas is then admitted to the adsorber unit in about 40 to 80 seconds, elevating the adsorber pressure from 10 mm. mercury absolute to about 110 p.s.i.g. When the adsorber unit has reached the desired pressure, an inlet gas control valve closes, sealing off the adsorber unit and an outlet valve at the other end of the unit from the inlet valve opens to a blower which delivers to a receiver tank. The receiver tank has a capacity of approximately 19 cu. ft. gas volume, operating at 15 p.s.i.g. at a temperature of 25° C.

As the adsorber outlet valve opens the hydrogen gas is released and the unit is depressurized down to about 2 p.s.i.g. When this pressure level has been reached a valve stops product gas delivery and an evacuation line opens allowing a vacuum pump to lower pressure in the adsorber bed to 10 mm. mercury. This draws the adsorbed nitrogen from the bed, reactivating it in preparation for the next charge of feed gas.

The product gas, hydrogen, released from the adsorber during the initial pressure release is discharged to a blower which in turn delivers to the receiver tank. In the receiver the hydrogen is mixed by a rotary type blower so that uniform product gas is available for withdrawal from the receiver as needed.

Using gas adsorbent grade charcoal with a high surface area, the product gas first passing from the adsorber unit which was initially pressurized to 100 p.s.i.g. is about 99.6% hydrogen; as pressure drops the released product gas becomes higher in nitrogen until at 2 p.s.i.g. the composition is about 79% $H_2$ and 21% $N_2$. The composite of all gas delivered to the receiver during reduction in pressure to 2 p.s.i.g. has a composition of approximately 96.2% hydrogen.

When the gases in an adsorber that has been initially pressurized to about 100 p.s.i.g. are released to a pressure of 20 p.s.i.g., the instantaneous composition of the gas then released comprises 95.5% hydrogen; at 10 p.s.i.g. it is 90.5% hydrogen; at 5 p.s.i.g., 84.5% hydrogen; and at atmospheric pressure, 72.5% hydrogen and 26.5% nitrogen. Therefore it is important in controlling purity of product gas that only gas collected before the adsorber pressure falls below a range of from 2 to 20 p.s.i.g., depending on desired hydrogen purity, is collected in the receiver.

By this process hydrogen gas of up to about 99.4% purity may be prepared. Use of higher product gas cut-off pressures at the end of the initial depressurizing period increases gas purity. In the case of reduced product gas removal from the receiver, gas can be recycled from the receiver back to the adsorber and through the adsorber again to further purify the hydrogen gas.

Feed gas usually used in this process will consist of about 3 parts of hydrogen gas to one part of nitrogen gas but this ratio may be changed without substantially affecting the efficiency of my process. Thus gases from dissociated ammonia could be treated in a manner to alter the usual nitrogen-hydrogen ratio and still be satisfactorily separated by this process.

The time for the pressurization and for the depressurization should each be at least 10 seconds and not more than 10 minutes. Purity is only slightly affected by reducing pressuring time from one minute to about twenty seconds. But times below this affect purity; time interval longer than 10 minutes should be avoided because of back diffusion of hydrogen.

Temperature of the compressed gases in the adsorber is optimally below 100° F. If adsorber temperatures are lowered, a higher purity hydrogen results, if the hydrogen yield is kept constant.

The active carbon required in this process may be any of several types, preferably a gas adsorbent grade of charcoal which has a high surface area and good abrasion resistance. Best results are usually obtained from using a rather coarse size activated char. I prefer to use a high density activated charcoal of about 5 to 15 mesh.

In order to prolong the usefulness of the charcoal it is important that no oil reach the adsorber unit. Compression equipment employed in this process should not be oil lubricated, as such lubricants deactivate the active carbon. An example of a satisfactory gas feed compressor is the Worthington 5 x 5 HB horizontal single stage, double acting machine.

Having fully described my invention, I wish to be understood that I do not desire to be limited to the exact details of the method described, for obvious modifications will occur to one skilled in the art.

What is claimed is:
1. A process for separating hydrogen from nitrogen contained in a gaseous admixture thereof comprising the steps of compressing said admixture to more than 25 p.s.i.g., charging the resultant compressed gases to a pressure zone containing a bed of active carbon, releasing said compressed gases from said pressure zone at a point removed from the charging inlet and collecting the gas released therefrom whereby a separation of hydrogen of at least 95% purity is effected.

2. A process for separating hydrogen gas from dissociated ammonia comprising the steps of dissociating ammonia, cooling the dissociated ammonia gases to less than 100° F., compressing the cool gases, charging the compressed gases into a pressure zone containing an activated charcoal bed maintained at a pressure of about 100 p.s.i.g., and after a time interval of at least 10 seconds releasing gas from said pressure zone at a point distant from the charging inlet until the pressure in said pressure zone is reduced to a range between 2 to 20 p.s.i.g. at the bed, collecting the gas released during the pressure reduction, and vacuumizing the charcoal bed to thereby reactivate it.

3. In a process for separating hydrogen gas from dissociated ammonia to obtain hydrogen of at least 95% purity, the steps comprising dissociating ammonia by high temperature and a suitable catalyst, cooling the dissociated ammonia to a temperature of about 60° F., compressing the cool gases, charging the compressed gases into a pressure zone containing an activated charcoal bed maintained at a pressure of about 110 p.s.i.g., and after a time interval of from about 20 to 60 seconds releasing gas from said bed at a point distant from the charging inlet until the pressure is reduced to not less than 2 p.s.i.g., collecting the gas released from said bed and mixing it and then exhausting the pressure of said bed to about 10 mm. mercury to reactivate the charcoal bed.

References Cited in the file of this patent
UNITED STATES PATENTS

| | | |
|---|---|---|
| 1,794,377 | Hasche et al. | Mar. 3, 1931 |
| 2,601,221 | Rosenblatt et al. | June 17, 1952 |
| 2,624,421 | Savage | Jan. 6, 1953 |

OTHER REFERENCES

"Active Carbon," by Hassler, Chemical Publishing Co., pages 44 and 277–278 (1951).